Jan. 14, 1958     H. E. HOWARD     2,819,605
SPECIFIC GRAVITY TESTER
Filed April 19, 1955     2 Sheets-Sheet 1
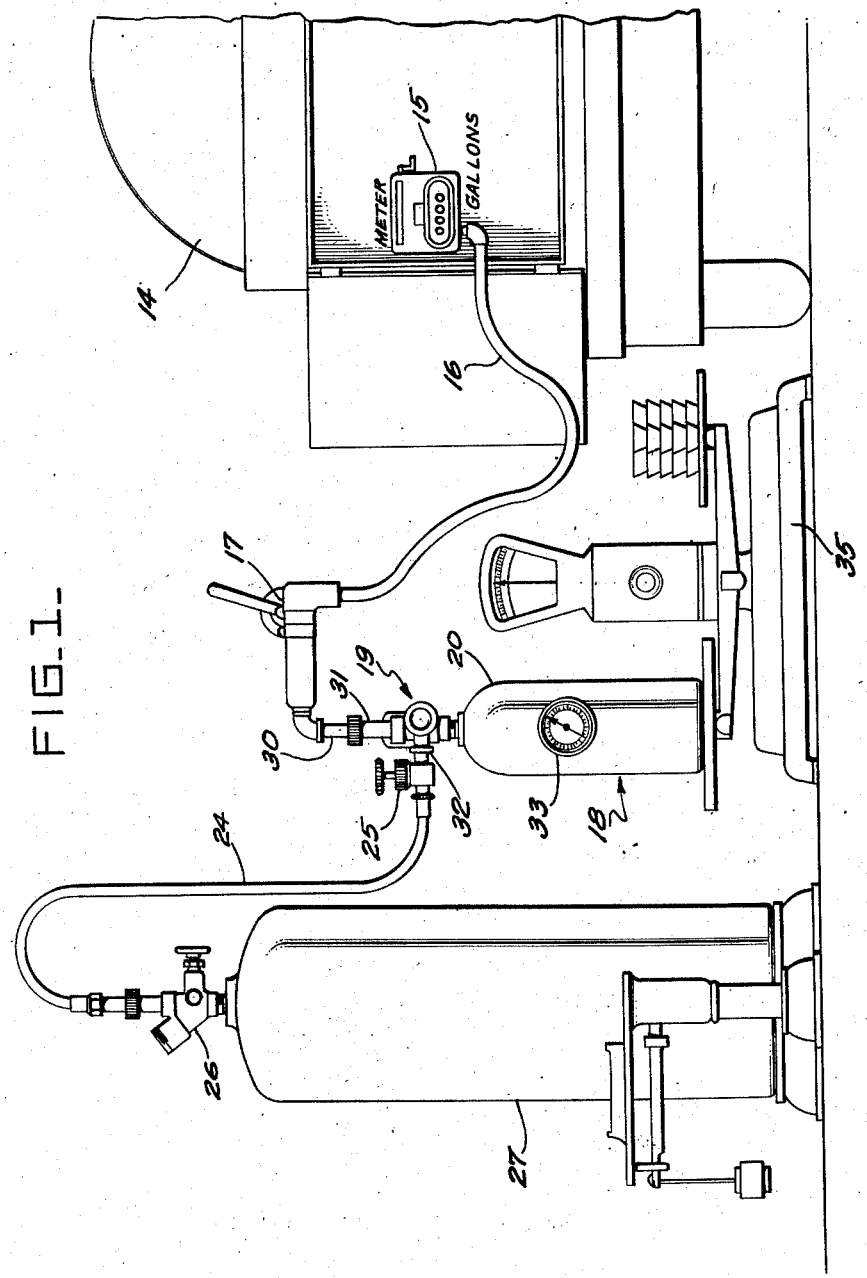
INVENTOR
*HARVEY E. HOWARD.*
BY *Richard L. Underwood*
ATTORNEY

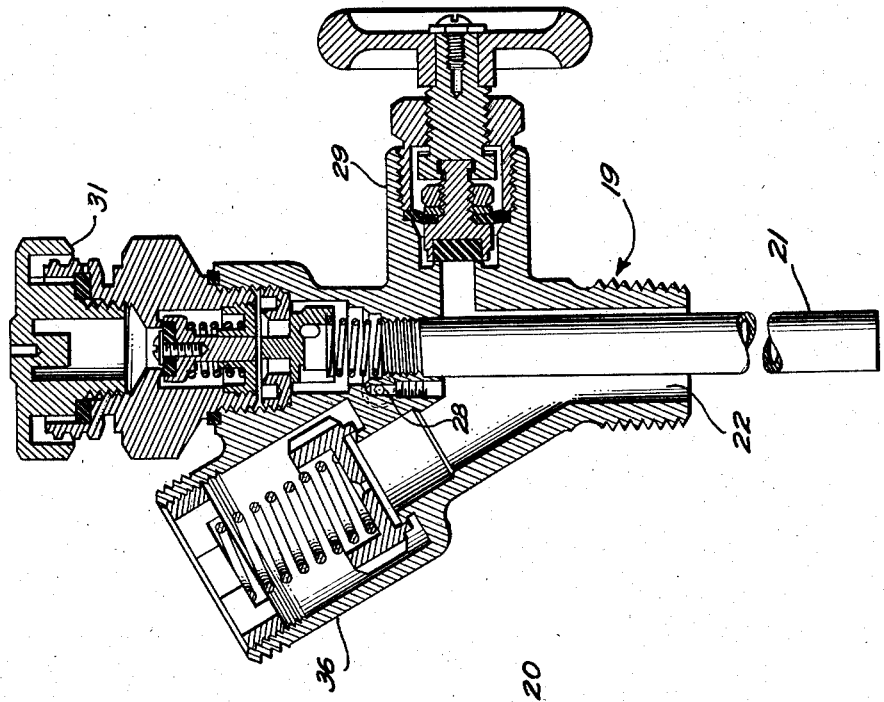
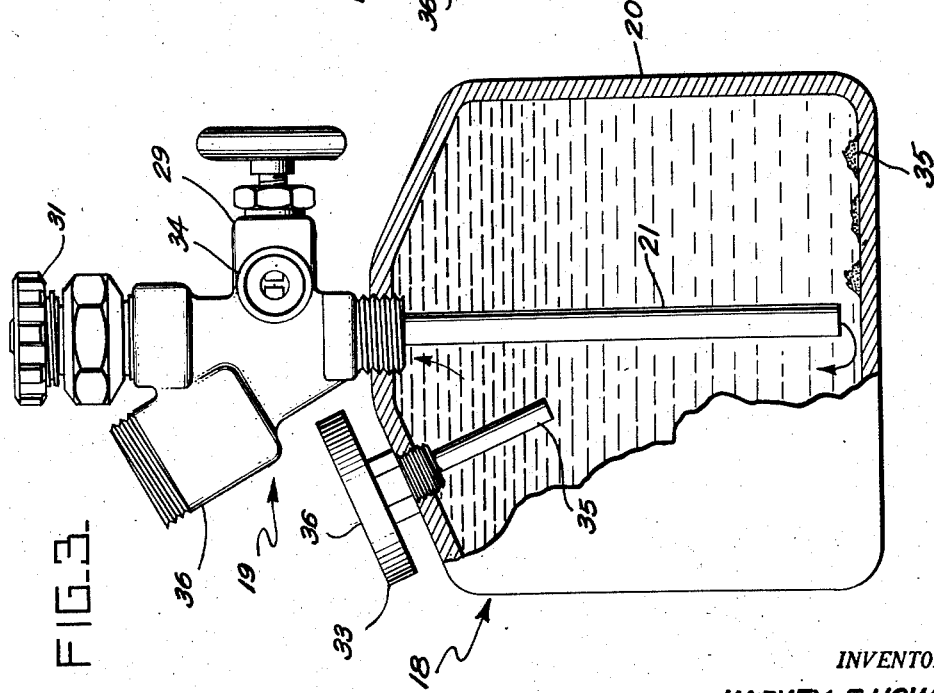

United States Patent Office 2,819,605
Patented Jan. 14, 1958

2,819,605

SPECIFIC GRAVITY TESTER

Harvey E. Howard, Miami, Fla.

Application April 19, 1955, Serial No. 502,293

1 Claim. (Cl. 73—32)

My invention relates to the technique of and apparatus for determining the specific gravity of liquefied petroleum gas in the field.

Laboratory tests for determining the specific gravity of liquids are, of course, well known. However, no apparatus of practical design is known to me to be available for checking the specific gravity of liquefied petroleum gas delivered from tank trucks to the consumers' storage tanks. Both the seller and purchaser are vitally concerned about this problem and look to the civil autthorities for assistance. It will be understood that the specific gravity of a liquefied petroleum gas is very critical in the determination of the value of the tank load. Also it is necessary that periodic checks be made of the volume flow meters on the delivery tank trucks. Since liquefied petroleum gas must be under pressure to be kept in the liquefied condition, simple volume tests by known techniques are not satisfactory. The laboratory techniques are far too cumbersome for field work and it is the testing in the field to which the technique and apparatus of my invention are specifically directed.

The apparatus of my invention for determining the specific gravity of liquefied petroleum gas comprises a weighing device on which is placed a container equipped with a thermometer and a valve means, the valve means including a back pressure intake valve connected to the tank truck, a safety valve, a bleeder valve, and an outlet shut-off valve connected to a storage tank.

Other objects and meritorious features of this invention will become apparent from the following description taken in conjunction with the drawings wherein:

Fig. 1 is a somewhat diagrammatic view of the apparatus of this invention coupled to the tank truck and the storage tank;

Fig. 2 is a vertical sectional view of a suitable valve means of known construction employed in the instant invention; and Fig. 3 is a view of the standard unit including the container, thermometer, and valve means with the container in partial section and shown in filled condition.

Referring now to Fig. 1, it will be seen that the tank truck 14 has a volumetric flow meter 15 through which the liquefied petroleum gas or liquid passes to the hose 16 and then through the lever shut-off valve 17 to the standard unit generally indicated as 18. The liquid passes through the valve means 19 into the container 20. The liquid as seen in Fig. 3 is directed to the bottom of the container 20 (which in Fig. 3 differs in shape from that of Fig. 1) by delivery pipe 21 and causes the exhausting of gas through the annular opening 22 (Fig. 2) in the valve means 19 and then out through the outlet shut-off valve 29 into the storage tank delivery line 24 (Fig. 1) which includes the storage tank shut-off valves 25 and 26. The storage tank shut-off valve 26 mounted on the storage tank 27 is similar to the valve means 19 mounted on the container and is known in the trade under the trade name "Rego 'Multi Valve'" which is constructed in accordance with U. S. Patents Nos. 2,005,931, 2,254,209, and 2,361,866.

After the standard unit 18 has been purged of all gas and the liquid is flowing to the storage container as determined by opening the bleeder valve 28 in the valve means 19, the outlet shut-off valve 29 is closed. The standard unit 18 including the container 20 and connecting parts of the valve means are then in completely filled condition. The coupling 30 to the back pressure intake valve 31 is then disconnected and the coupling 32 to the outlet shut-off valve 29 is disconnected from outlet 34, leaving the standard unit 18 as an independent structure consisting of the container 20, a dial-type thermometer 33, and the valve means 19, as shown in Fig. 3.

The container 20 as seen in Fig. 3 has inert material 35 contained therein in a predetermined amount to establish an exact gallon volume for the standard unit 18. The tare weight of the empty standard unit 18 consisting of the container, thermometer and valve means is a known weight and this subtracted from the weight of the filled standard unit as determined from weighing means 35 (Fig. 1) results in the net weight of the gallon of liquid. By noting the temperature of the liquid from thermometer 33 and applying the net weight and temperature to a suitable table, the specific gravity of the liquefied petroleum gas at the standard temperature of 60° F. can be speedily determined.

For example, let us assume that the observed temperature of the liquid in the standard unit is 78° F. and the net weight of the gallon of liquid is 4.088 lbs. These data can now be employed in the use of the following table to obtain the specific gravity:

Table of weights for 1 gallon of L. P. gas specific gravities at 60° F.

| Observed temperature of metered gas, degrees F. | Specific gravities | | | |
|---|---|---|---|---|
| | 0.503 | 0.504 | 0.505 | 0.506 |
| 72 | 4.101 | 4.113 | 4.122 | 4.130 |
| 74 | 4.088 | 4.096 | 4.105 | 4.113 |
| 76 | 4.072 | 4.084 | 4.092 | 4.100 |
| 78 | 4.059 | 4.071 | 4.080 | 4.088 |
| 80 | 4.042 | 4.058 | 4.067 | 4.075 |
| 82 | 4.026 | 4.042 | 4.050 | 4.058 |

It will be noted from the above table that the specific gravity of the liquid in the example above is 0.506 at 60° F., the standard temperature for calculations.

It will be appreciated that the above table is an excerpt from a much larger table and is used for illustration purposes.

It will be noted that the thermometer means 33 is mounted on the container 20 and has a temperature-responsive portion 35 extending within the container and into the liquid as well as a temperature indicator 36 of the dial type which is viewable from outside the container.

The container 20 is preferably capable of meeting a minimum 1000 lb. pressure test. The valve means 19 includes a safety valve 36 set at 215 p. s. i.

In practice it has been found that the results obtainable by the above technique and apparatus are very satisfactory for checking the correctness of the volume flow meters on delivery trucks as well as investigating the specific gravity of the liquefied petroleum gas delivered to a customer by a tank truck carrier.

To determine the accuracy of the volume flow meters on delivery trucks, a few gallons are pumped through hose 16 and standard unit 18 to the storage tank 27, thereby filling the standard unit 18 as previously explained and enabling the purging of the storage tank 27. The standard unit 18 is then removed as a unit from the delivery line, the tare weight of the storage tank 27 is recorded from the scale, the flow meter 15 is set at zero, and a relatively large quantity (such as 20 gallons) of liquefied gas is pumped to the storage tank 27. The actual weights of the quantity of liquid delivered to the storage tank 27 and contained in the previously filled standard unit 18 are then determined. The actual volume of liquid delivered to the storage tank can then be calculated and compared with the reading of the flow meter 15.

For example, in a recent test at 60° F. the standard unit 18 contained a gallon weighing 4.187 pounds. Twenty gallons according to the flow meter 15 were delivered to the storage tank 27; this volume was found to weight 84.370 pounds. Calculations were as follows:

$$\frac{84.370 \text{ lb.}}{4.187 \text{ lb.}} = \frac{X \text{ gal.}}{1 \text{ gal.}}$$

$$X \text{ gal.} = 20.15 \text{ gal.}$$

Therefore, the flow meter 15 which showed 20 gallons was 0.75% slow.

The apparatus is rugged and the technique of testing is uniquely uncomplicated, enabling its use by persons other than highly skilled technicians.

While I have shown and described herein only one specific embodiment of my invention, it will be appreciated that many changes and modifications can be made in the form, construction and assembly and in the manner of association and use of the parts without departing from the spirit and scope of my invention.

I claim:

In a system for determining in the field the specific gravity of liquefied gas being delivered from a delivery tank to a storage tank, the combination of a weighing device; a container of predetermined volume and having high strength to withstand high pressures on said weighing device, valve means mounted on said container having a back pressure intake valve adapted for connection to said tank truck, said valve means having a safety valve to protect the container, said valve means having a bleeder valve for releasing gas upon filling said container and for determining when the container has been filled with liquid and all gas exhausted, said valve means having an outlet shut-off valve adapted for connection to said storage tank; and thermometer means mounted on said container and having a temperature-responsive portion within said container and a temperature indicator outside said container.

References Cited in the file of this patent
UNITED STATES PATENTS 268,049     Sourbe _____ Nov. 28, 1882

FOREIGN PATENTS 30,850     Australia _____ Dec. 23, 1930
959,261     France _____ Sept. 26, 1949